US011908619B2

(12) United States Patent
Kovalev et al.

(10) Patent No.: US 11,908,619 B2
(45) Date of Patent: Feb. 20, 2024

(54) ELECTROMAGNETIC METAL PIPES PROTECTION DEVICE

(71) Applicant: SediFlo LLC, Houston, TX (US)

(72) Inventors: Leonid Mikhaylovich Kovalev, Astrakhan (RU); Evgeniy Leonidovich Kovalev, Astrakhan (RU); Evgeny Sokryukin, Odintsovo (RU); Kirill Sokryukin, Odintsovo (RU); Egor Sokryukin, Odintsov (RU)

( * ) Notice: Subject to any disclaimer, the term of this patent is extended or adjusted under 35 U.S.C. 154(b) by 151 days.

(21) Appl. No.: 17/687,301

(22) Filed: Mar. 4, 2022

(65) Prior Publication Data

US 2023/0282403 A1    Sep. 7, 2023

(51) Int. Cl.
*H01F 7/06*    (2006.01)
*H01F 7/20*    (2006.01)
*H01Q 7/00*    (2006.01)

(52) U.S. Cl.
CPC .............. *H01F 7/064* (2013.01); *H01F 7/20* (2013.01); *H01Q 7/00* (2013.01)

(58) Field of Classification Search
CPC .............. H01F 7/064; H01F 7/20; H01Q 7/00
USPC ......................................................... 361/152
See application file for complete search history.

(56) References Cited

U.S. PATENT DOCUMENTS

| | | | |
|---|---|---|---|
| 11,242,267 B1 * | 2/2022 | Clark | ........................ C02F 5/00 |
| 2012/0217815 A1 * | 8/2012 | Clark | ..................... H01F 38/14 |
| | | | 307/104 |

FOREIGN PATENT DOCUMENTS

| | | | | |
|---|---|---|---|---|
| CA | 2966784 C | * | 3/2020 | ............. E21B 34/06 |
| RU | 2397420 C1 | * | 8/2010 | |
| WO | WO-9508510 A1 | * | 3/1995 | .............. B01J 19/12 |

OTHER PUBLICATIONS

Machine translation of Alekseev et al. Russian Patent Document RU 2397420 C1 Aug. 2010 (Year: 2010).*

* cited by examiner

*Primary Examiner* — Kevin J Comber
(74) *Attorney, Agent, or Firm* — Aleksandr Smushkovich

(57) ABSTRACT

An electromagnetic protection device is proposed to prevent adhesion of paraffin and other impurities dissolved in a hydrocarbon liquid to the inner surface of a metal pipeline. The device includes a power supply (battery or industrial electric grid), microprocessor unit, radiating antenna, antenna amplifier including solenoid, MOSFET transistor, capacitors, current and voltage sensors. A virtual capacitor, participating in generating electromagnetic waves preventing the adhesion, is formed between surfaces of the pipeline and a conductive part of the radiating antenna. The microprocessor allows setting an optimal operating mode of the device. The device is preferably furnished with two mount units including extendable rotatable spacers and flexible bands, adjustably fixing the device and radiating antenna to the pipeline. Each spacer includes a bushing including three connected hollow cylinders, two of which have threadings on inner surfaces, and two rods with mating threadings, enclosed in the cylinders, providing for moving the rods therein.

4 Claims, 12 Drawing Sheets

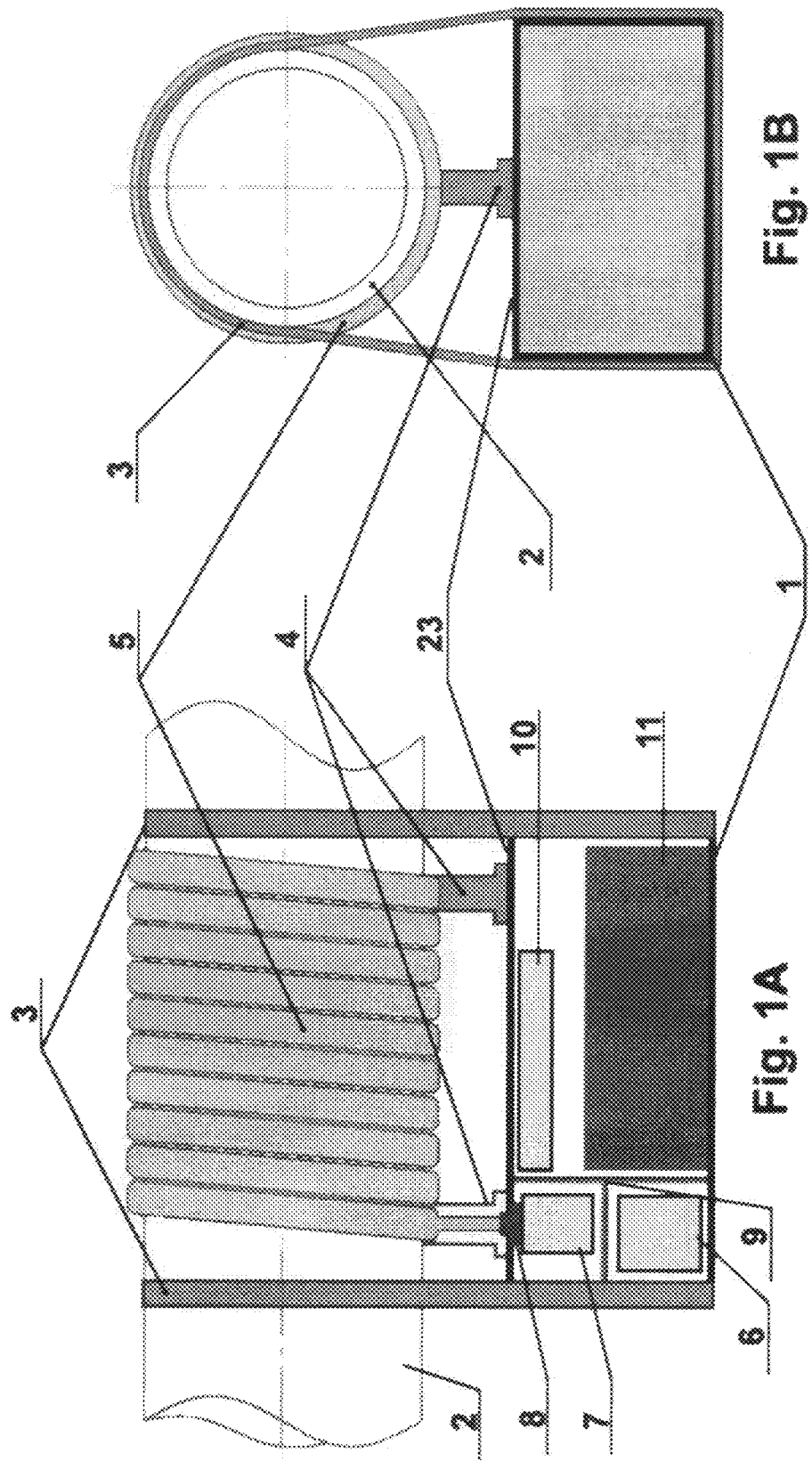

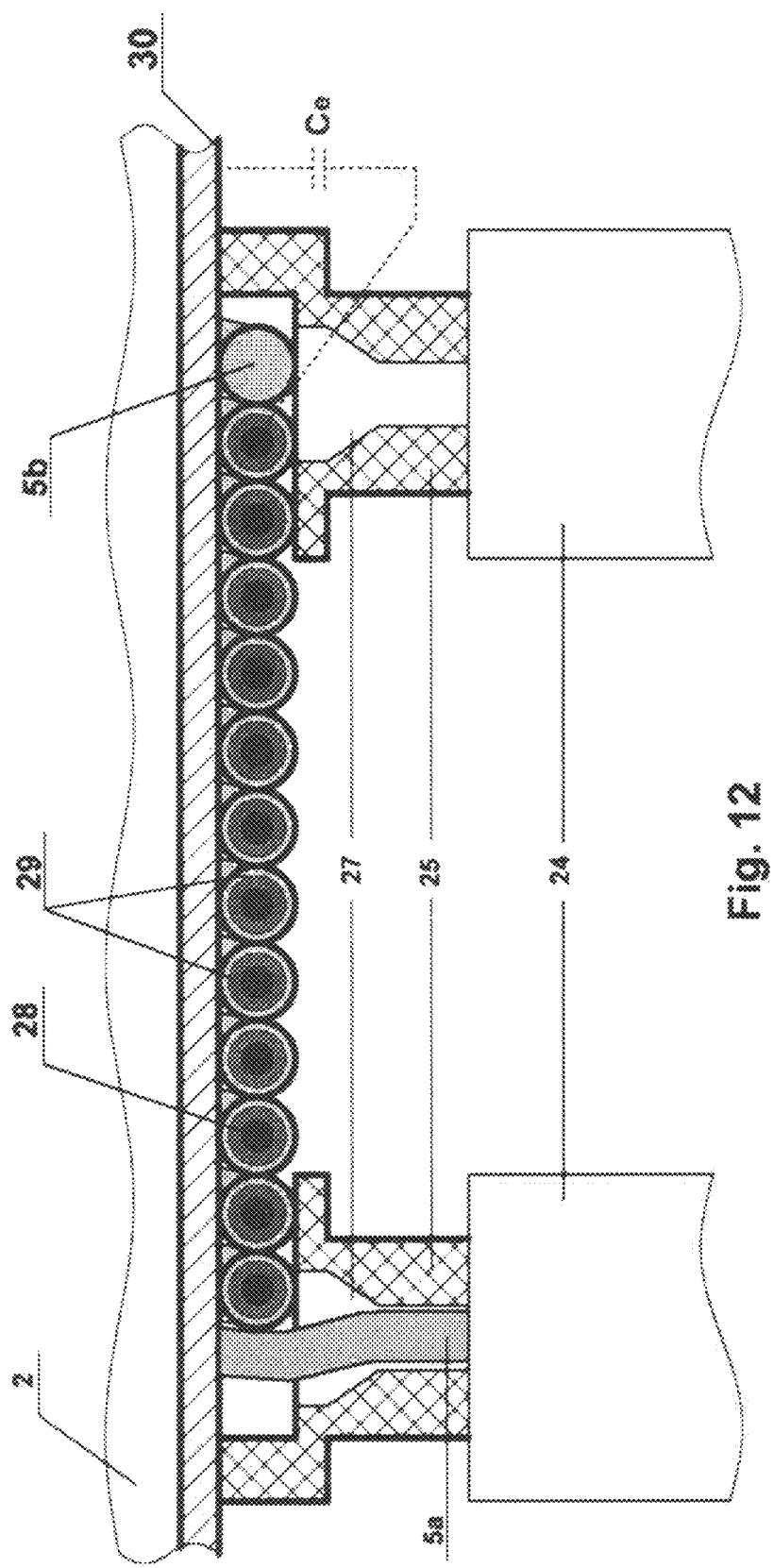

ELECTROMAGNETIC METAL PIPES PROTECTION DEVICE

FIELD OF THE INVENTION

The invention primarily relates to transportation of liquid hydrocarbons (particularly, oil) via metal pipelines and protection of the pipelines from deposits of impurities contained in the liquid hydrocarbons. It can also be used in other industries utilizing metal pipelines.

BACKGROUND OF THE INVENTION

Known are electromagnetic protection devices, for example, described in U.S. Pat. No. 5,514,283 issued 7 May 1996, U.S. Pat. No. 8,033,334 B2 issued 11 Oct. 2011 and U.S. Pat. No. 9,181,113 B2 issued 10 Nov. 2015. They basically represent various modifications of an idea of excitation of an external pulse electromagnetic field that spreads throughout a metal pipeline transporting hydrocarbons, which prevents deposition of water-insoluble substances on the inner walls of the pipeline, which substances otherwise reduce the effective diameter of the pipeline that might significantly decrease the flow of hydrocarbon therethrough.

All the aforementioned devices differ only in the method of excitation of the electromagnetic field, but have the same drawback. It is declarative nature of the merits of these inventions without giving theoretical justifications and experimental data confirming the effectiveness of these inventions.

In a theoretical analysis, the described electromagnetic method of protecting metal pipes transporting hydrocarbons from undesirable adhesion of foreign substances showed delightful prospects in theoretical analysis. It was necessary to hold several experiments with various methods of excitation of a high-frequency electromagnetic field in such metal pipe.

OBJECTIVE AND A BRIEF DESCRIPTION OF INVENTION

The proposed invention makes it possible to have a more significant effect on reducing the adhesion process of various impurities to the inner wall of a metal pipe transporting hydrocarbons, due to implementing an innovative design of the proposed device improving efficiency of the power source of this device during the generation of an electromagnetic wave.

In addition, one of the differences between this invention from the aforementioned patents is that the electromagnetic wave generator (hereinafter referred to as a "radiating antenna", made in the form of a multi-turn coil) is not laterally attached to the outer surface of a metal pipe transporting hydrocarbons (hereinafter referred to as a "pipeline"), but directly wound in a special way on the pipeline itself at a time of installation.

The pipeline, in this case, plays the role of a waveguide. The radiating antenna provides a maximum electromagnetic field strictly along the longitudinal axis of symmetry. That means that energy losses for radiation into the surrounding space are minimized differing from known devices, where the radiating part of the device is mounted on the outer side of pipeline and close to it. In the case of such lateral fastening, there are unproductive energy losses for radiation into space away from the pipe's axis that does not cause any effect on the adhesion process of paraffin, calcium and other undesirable chemical compounds.

Moreover, to detect the effect, the authors of the aforementioned patents need to increase the power of the radiation antenna several times, which significantly complicates the use of batteries or solar panels.

An important advantage of the above described positioning of the radiating antenna of the proposed device is the use of the pipeline itself as an integral part of this radiating antenna. This minimizes unproductive energy losses for radiation of electromagnetic waves into surroundings. The proposed device consumes only 1.5 W of power from the power source and can work for 2 hours even from a conventional 9-volt battery.

According to a preferred embodiment of the invention, a first end of the radiating antenna is connected to the control unit of the proposed device through a sealed coaxial connector located in a first mount unit of this device. A second mount unit of this device fixes a second isolated end of the radiating antenna so that its turns always remain tightly pressed to each other. In this case, the electric circuit closes through a virtual capacitor known as stray capacitance, formed by the conductive surface of the radiating antenna, the pipeline, and the case of the device.

Energy is supplied to the radiating antenna by a solenoid (inductance) L1 (FIG. 3A), controlled by a powerful high-voltage transistor that receives commands from a microprocessor. Preferably, a high voltage MOSFET type transistor is used. A good result can be achieved using the FDPF4N60NZ® MOSFET transistor from Fairchild or its close analog SSP2N60B® from the same company.

The operating mode of this high-voltage transistor is determined by a software-controlled generator acting as a part of AtTiny2313® microprocessor of Atmel's CPU (central processing unit).

The power supply of the proposed device can be carried out from an industrial grid of alternating voltage 110/220V, or an accumulating battery preferably with a voltage of 12V and a capacity of at least 35 Amp-hours. As a result of the proposed innovative schematic solutions, the energy of such the battery is enough for 1 month of operation without a decrease in device performance, and thereafter maintenance staff should replace the battery. As an option, it is possible to use solar panels as power sources in geographical areas with a sufficient number of sunny days per year, as well as other sources of renewable energy.

The device is fixed to the pipeline without the use of special tools. The case of the control unit is preferably mounted using two loop-shaped flexible tapes preferably made of heat-stable plastic. Two aforementioned mount units, preferably being extendable rotatable spacers, can be used to fix the device and the second of end of the radiating antenna to the pipeline. Other design options for attachment of the device to the pipeline are also possible.

BRIEF DESCRIPTION OF DRAWINGS OF THE INVENTION

FIG. 1A and FIG. 1B (side view) illustrate the proposed device set up on the pipeline with modification of independent powering from an accumulator battery. The mutual arrangement of the basic electronic components of the device inside the protective case is also shown herein.

FIG. 12 shows structural components of the device and the pipeline, wherein some of the components form a virtual capacitor Ce, which takes an important part in the formation of an electromagnetic wave.

BASICS OF THE ELECTROMAGNETIC METHOD FOR PROTECTION OF PIPELINES

Figure 2:
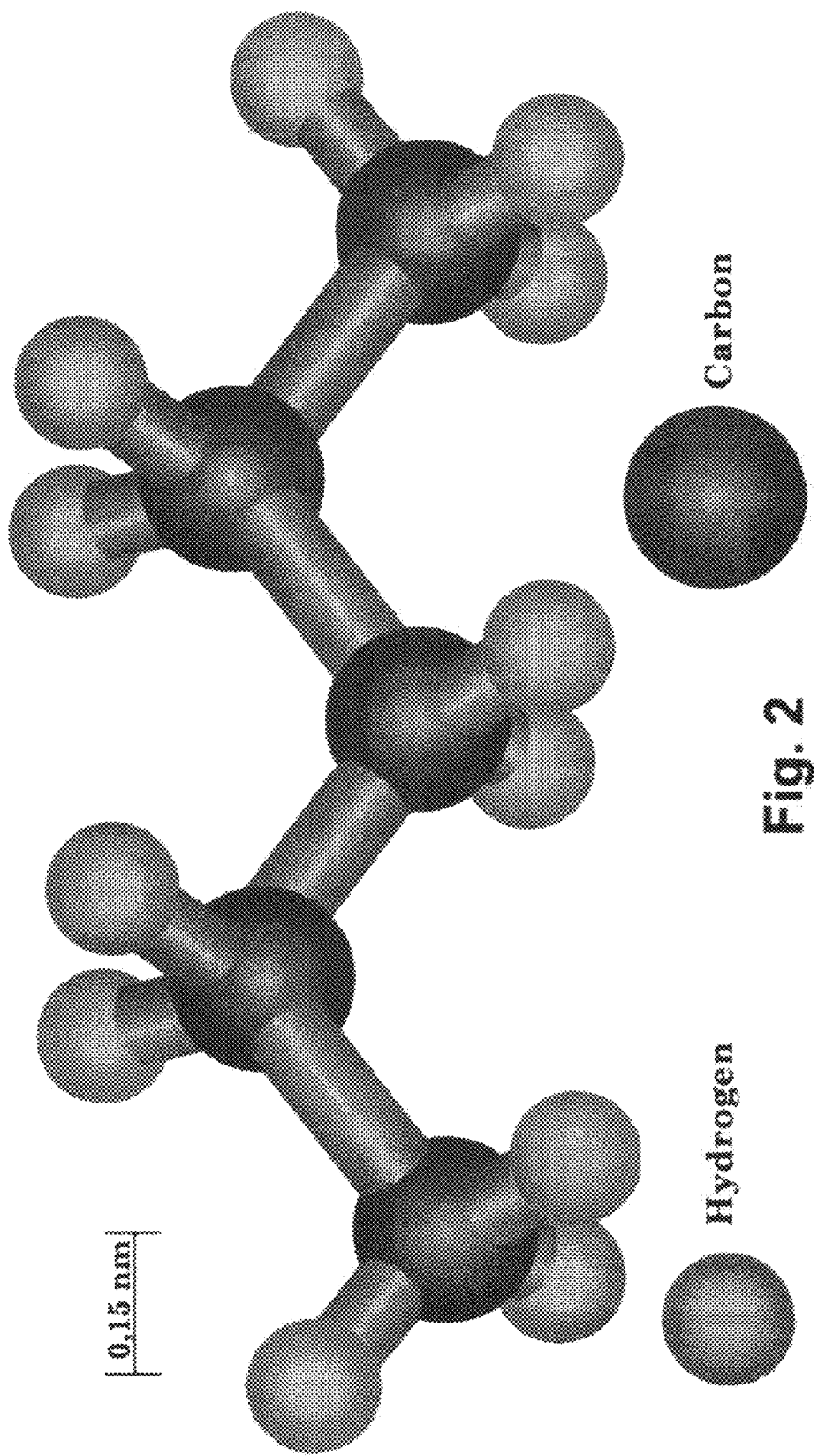
FIG. 2 shows a dimensional arrangement of atoms in a fragment of a paraffin molecule.

To better understand the method of pipeline electromagnetic protection from undesirable adhesion of free calcium paraffin, asphaltene, and other compounds, it is necessary to turn to the theory of intermolecular interaction forces, which are called van der Waals forces. These forces have an electromagnetic origin and arise during the polarization of molecules. For example, consider a fragment of a paraffin molecule, FIG. 2.

Furthermore, paraffins are related to saturated hydrocarbons. In them all valence bonds of carbon atoms are occupied by hydrogen atoms. The general chemical formula of saturated hydrocarbons—$C_2H_{2n+2}$. Substances with the number of carbon atoms from 18 to 35 are called paraffin. On a macroscopic scale, paraffin molecules are electrically neutral. However, on a microscale, under the influence of external electrostatic forces, one of the sources of which are dipole molecules, long linear chains of paraffin molecules undergo spatial deformations and, as a result, the so-called induced polarization of the molecule occurs.

In addition, this fact creates favorable conditions for the formation of small paraffin granules or adhesive bonding of paraffin molecules or granules to the inner wall of the pipeline, the structure of which contains inclusions of foreign materials, such as calcium, magnesium, phosphorus and others, capable of forming galvanic couples with the pipe material. Galvanic couples have a weak electrostatic field. However, it is quite sufficient to ensure stable adhesion of polarized paraffin molecules.

The electromagnetic protection of pipelines is based on the weakness of adhesive forces described above, which are of an electromagnetic nature. An electromagnetic wave, running through the pipeline, destroys weak adhesive bonds, thereby facilitating the removal of impurities with a liquid flow from the zone of action of the electromagnetic protection device. The destruction of galvanic couples occurs, including in the surface layer of the pipeline metal, which are the cause of the so-called galvanic corrosion of the metal. This fact gives the right to assert that electromagnetic protection not only prevents unwanted adhesion but excludes damage to the pipeline by galvanic corrosion.

DETAILED DESCRIPTION OF PREFERRED EMBODIMENTS OF THE INVENTION

Figure 1C:
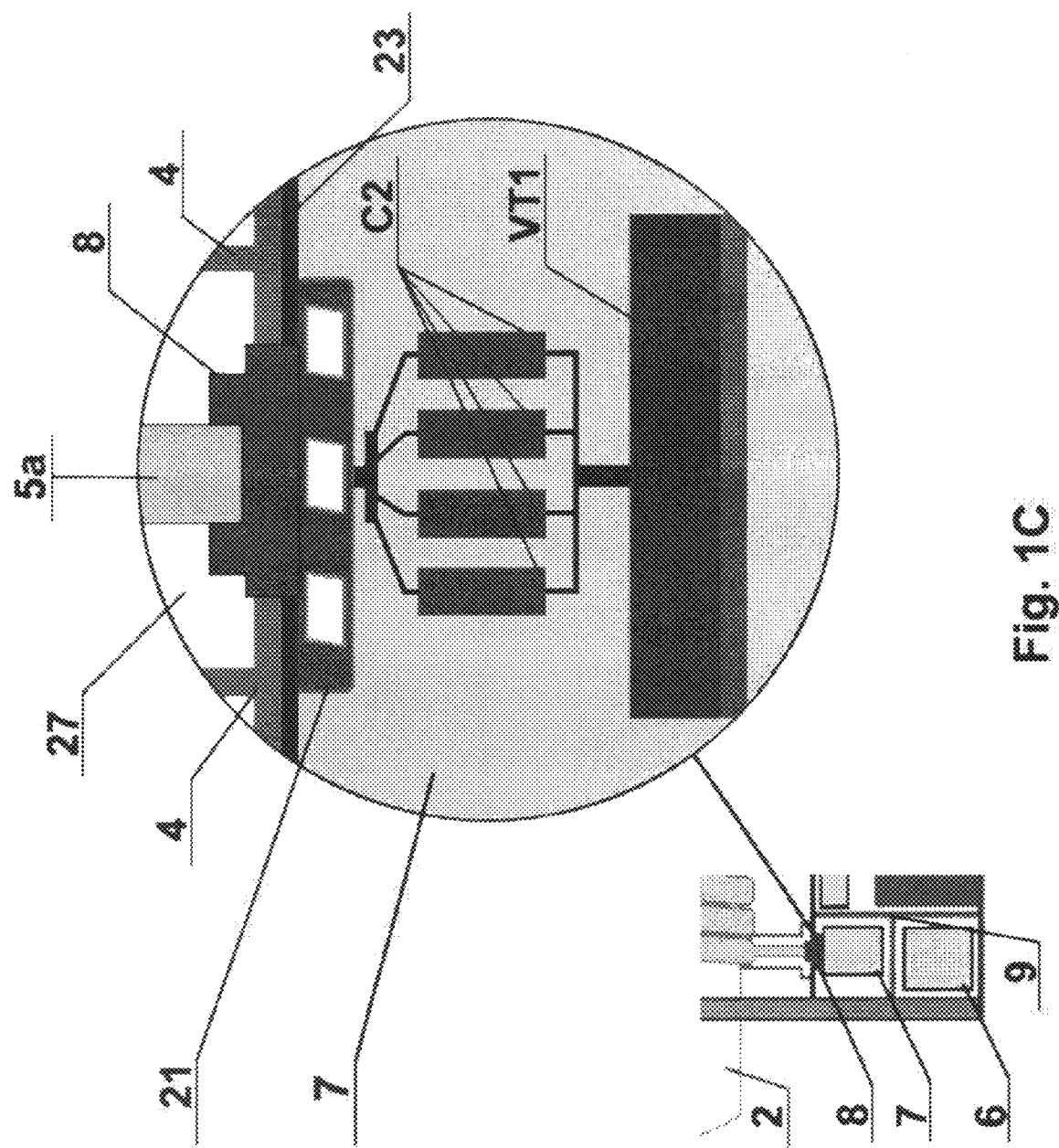
FIG. 1C shows the disposition of the microprocessor, the radiating antenna electrical connector, the antenna amplifier, a voltage sensor of the radiating antenna, and other components of the device.

According to a preferred embodiment of the present invention, in FIG. 1A, FIG. 1B and FIG. 1C schematically shows the components of the proposed device for electromagnetic protection of metal pipes (hereinafter referred to as 'device'):

A case 1 of the device, accommodating and protecting device components (FIG. 1A, 1B, 1C), including electronic components (FIG. 3A) from harmful environmental impact. The case 1 also functions as an electromagnetic screen protecting electronic circuits of the device from external electromagnetic interference. It has a top cover 23, which, in particular, serves for attachment of other components of the device described below.

A metal pipeline 2 (the drawings show a fragment thereof), which the device is mounted on.

Two loop-shaped flexible tapes 3 made of thermostable plastic, preferably from Zedex®, are designed to fix the case 1 of the device to the pipeline 2.

Figure 11:
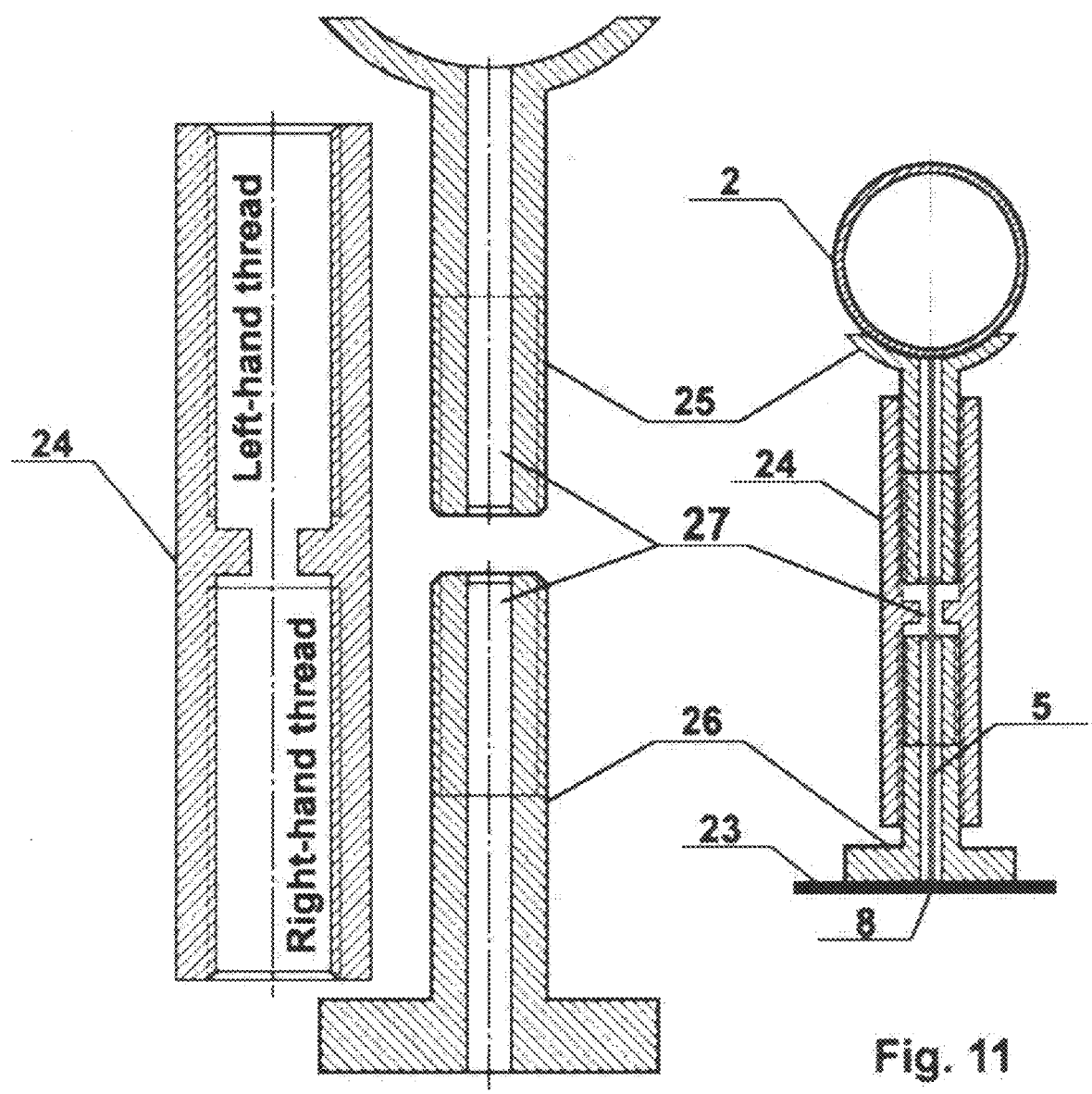
FIG. 11 illustrates the design of a rotatable spacer of the device.

Two rotatable spacers 4, preferably identical in design, are provided for adjusting the position of the device during mounting thereof on the pipeline 2. They are placed in between the surface of pipeline 2 and the top cover 23, which allows changing the distance between the surface of pipeline 2 and the top cover 23 and securing the device on the pipeline 2. Each of the rotatable spacers 4 (FIG. 11) includes:

a) bushing 24, formed of:—an upper hollow cylinder having its inner diameter, wherein a left-hand spiral threading is applied to the inner wall of the upper cylinder;—a lower hollow cylinder having its inner diameter, wherein a right-hand spiral threading is applied to the inner wall of the lower cylinder;—a middle hollow cylinder connecting the upper cylinder with the lower cylinder, wherein the inner diameter of the middle cylinder is less than the inner diameters of the upper and lower cylinders, and the upper, middle and lower cylinders have the same outer diameter;

b) an upper rod 25 having a through axial hole, wherein a left-handed screw thread is applied to the outer surface of the upper rod 25, mating with the left-hand screw thread of the upper cylinder, so that the upper rod can move vertically relative to the upper cylinder, while, a top of the upper cylinder is shaped as a cylindrical segment mating with the surface of the radiating antenna;

c) a lower rod 26 having a through axial hole, wherein a right-hand screw thread is applied to the outer surface of the lower rod 26, mating with the right-hand screw thread of the lower cylinder, so that the lower rod can move vertically relative to the lower cylinder, while, a bottom of the lower cylinder formed in the form of an annular base fixed on the cover 23.

The through-hole of the upper rod 25, the through-hole of the lower rod 26, and the space formed by parts of cavities of the upper, middle, and lower cylinders of the bushing 24, enclosed between the upper rod 25 and the lower rod 26, collectively constitute an internal through channel 27. The rotatable spacers 4 are made of plastic or other electrically insulating material. In other embodiments, it is possible to use more than two rotatable spacers 4, or use other attachment means for this purpose.

A radiating antenna 5 is preferably made of double-insulated stranded copper wire. The radiating antenna 5 is designed to generate and transmit an electromagnetic wave. Propagating along the length of pipeline 2, the electromagnetic wave destroys adhesion bonds of impurities dissolved in the liquid (in particular, in transported hydrocarbons), preventing their deposition on the inner surface of pipeline 2.

A first end 5a of the radiating antenna 5 passes through the channel 27 (FIG. 1C and FIG. 12) of the first spacer 4 and is used to connect the device to the radiating antenna 5, using a hermetic coaxial electrical connector, described below, and built into the bottom of the first rotatable spacer 4.

The second end 5b of the radiating antenna 5 is fixed in such a way that the turns of the radiating antenna 5 always remain tightly pressed against each other. This second end 5b of the radiating antenna 5 is reliably insulated, and the electrical circuit is completed through a virtual capacitor Ce (FIG. 12) collectively formed by conductive surfaces of the radiating antenna 5, the pipeline 2 and the case 1.

A central processing unit—CPU 6 is preferably implemented on the AtTiny2313® microprocessor.

A microprocessor program of the CPU 6 controls the operation of the device, controlling the frequency of a built-in generator in the AtTiny2313 microprocessor and the duty cycle of pulses supplied to the antenna amplifier (described below) to tune to an optimal mode of generating electromagnetic waves. For visual control of the status of the device and its performance, it includes an indication panel.

An antenna amplifier 7, preferably made on a high-voltage transistor of the MOSFET type, is designed to excite an electromagnetic wave in the radiating antenna 5.

A hermetic electrical connector 8, designed to connect the radiating antenna 5 to the antenna amplifier 7. The electrical connector 8 is secured in the top cover 23. FIG. 1C schematically shows the location of the connector 8 in relation to components of the antenna amplifier 7 (C2, VT1) and a current sensor of the radiating antenna.

An electromagnetic screen 9, made preferably of electrical steel or permalloy. It is designed to protect the CPU 6 and microchips of the display panel (described below) from high-frequency electromagnetic interference generated by the antenna amplifier 7. The electromagnetic screen 9 is mounted within the case 1 and encloses the CPU 6 and the antenna amplifier 7.

A display panel 10 is designed for visual monitoring of the status and operation of the device. The display panel 10 controls two indicators. The first indicator warns of exceeding the allowable voltage at the drain of the transistor VT1 (FIG. 3A), the second indicator is a strip, preferably of ten LEDs, the joint glow of which is proportional to the current of the radiating antenna. The device is considered suitable for operation if 7 out of 10 LEDs are lit. All indicators are arranged on the side surface of case 1 of the device.

A power supply unit 11 (FIG. 1A, 10), in the version of autonomous power supply, is disposed in the case 1 and provides the device with electrical energy.

Figure 3A:
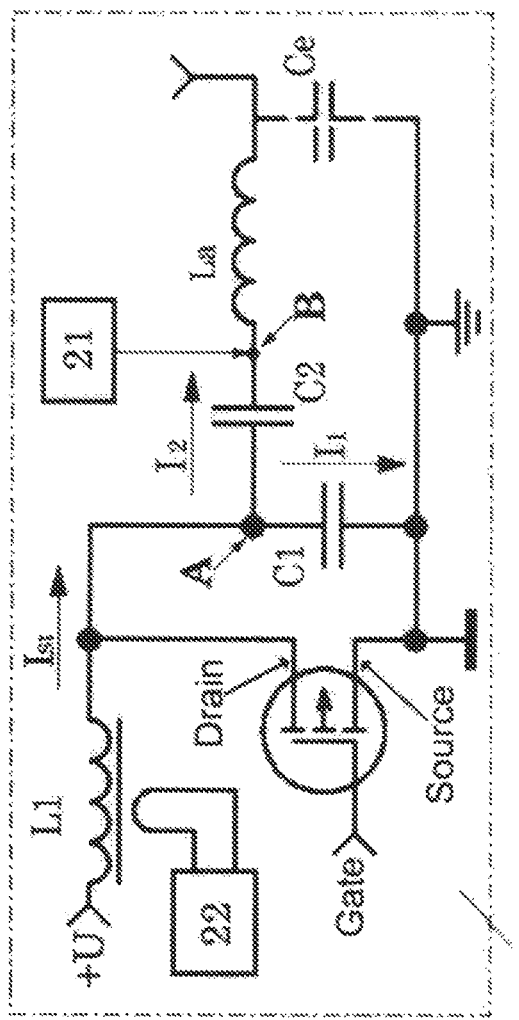
FIG. 3A shows the electrical scheme of the antenna amplifier of the proposed device.
Figure 3B:
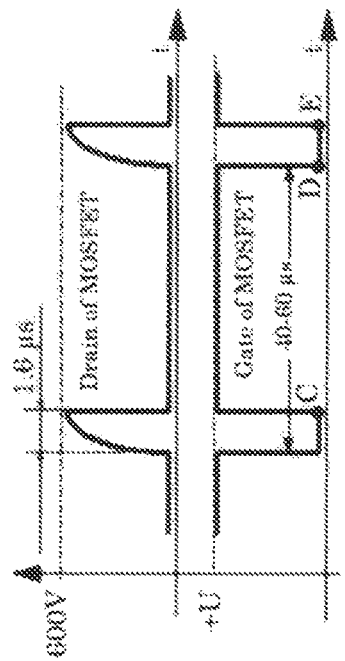
FIG. 3B shows timing diagrams illustrating the operation of the antenna amplifier.

FIG. 3A is a diagram of the antenna amplifier 7 (FIG. 1A), FIG. 3B represents timing diagrams of voltages at the control points of the antenna amplifier 7 (FIG. 1A).

The antenna amplifier 7 (FIG. 3A) is located in case 1 and includes the following elements:

A solenoid (inductance) L1, preferably made of an EPCOS N87® ferrite ring with a size R29.5/19.0/14.9 and containing preferably 140 turns of enameled wire ⌀0.23 mm. It is designed to accumulate the energy of magnetic field and then dump this energy into the radiating antenna 5 (FIG. 1A).

A high voltage MOSFET type transistor VT1, preferably FAIRCHILD® FDPF4N60NZ®. It is designed for excitation of self-induction EMF in the solenoid L1, and discharging the energy accumulated in the magnetic field of solenoid L1 into the radiating antenna 5.

A buffer high-voltage capacitor C1. It is designed to protect the transistor VT1 from surges of overvoltage and has a permissible voltage of at least 1 kilovolt.

A passing capacitor C2, preferably represented by a battery of four capacitors. Through it, the energy of the magnetic field accumulated in the solenoid L1 is discharged into the radiating antenna 5.

An antenna current sensor 21. It provides information about the power of a signal of the radiating antenna 5 to the CPU 6 for processing and analysis, as well as to the circuit of the display panel 10 for visualizing the power in the radiating antenna 5.

A voltage sensor 22 supplies information about the voltage level at point A of the antenna amplifier circuit 7 to the CPU 6 to prevent surges of overvoltage of the transistor VT1.

FIG. 3A shows the radiating antenna 5 connected to the antenna amplifier 7 via the hermetic connector 8, and the capacitor Ce (herein referred to as a 'virtual capacitor') formed by the conductive surface of the radiating antenna 5 and the outer surface 30 of the pipeline 2 (FIG. 12), which radiating antenna 5 is wound on.

A first plate of capacitor Ce is represented by a wire 28 (FIG. 12) (preferably copper) of the radiating antenna 5, and a second plate is represented by the outer surface 30 of the pipeline 2. Dielectric between the plates is an insulation layer 29 (FIG. 12) (preferably double insulation) of the wire 28 of the radiating antenna 5. The device itself is grounded, (shown in FIG. 3A), that is, there is an electrical contact between the pipeline 2 and the case 1 of the device.

Figure 8:
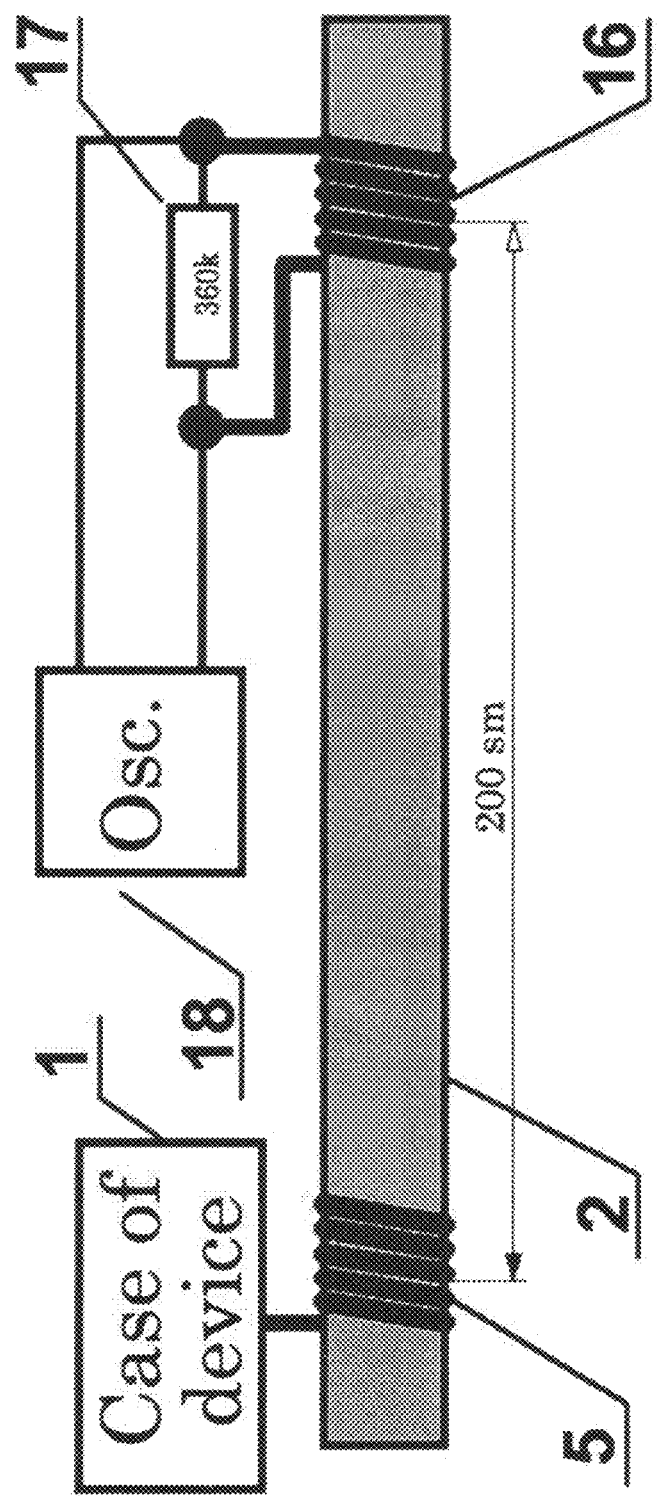
FIG. 8 shows a scheme of registering an electromagnetic wave process on the surface of the pipeline.

FIG. 8 shows a diagram of the registration of an electromagnetic wave process on the surface of pipeline 2 using an oscilloscope 18. FIG. 8 shows a measuring coil 16 of wire wound directly on the steel pipeline 2; it consists of preferably 10 turns of insulated copper wire with a load resistor 17, preferably of 360 kiloOhms. During the measurement, the center of the measuring coil 16 was located at a distance of 200 cm from the center of the radiating antenna 5.

OPERATION OF THE DEVICE

Figure 10:
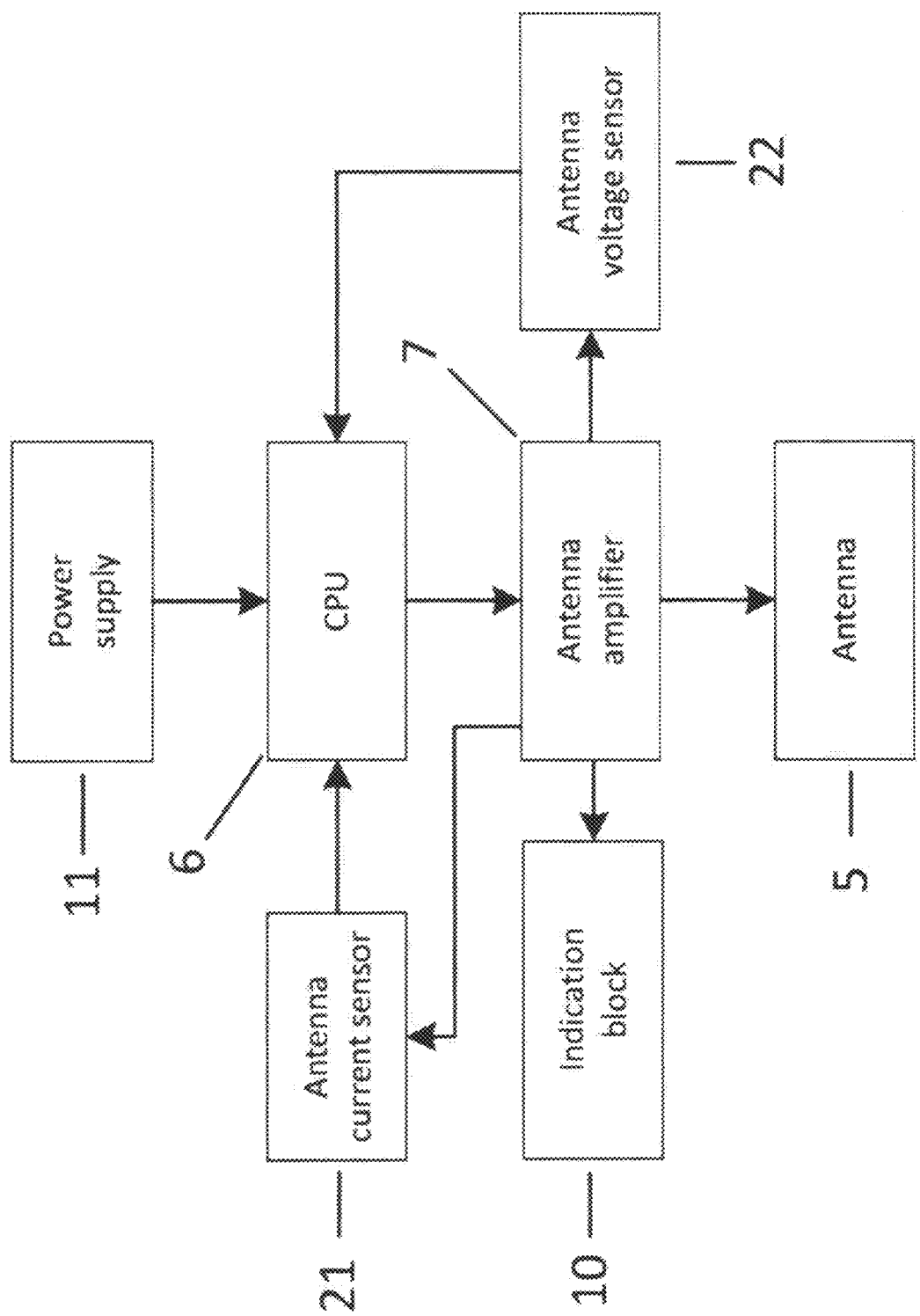
FIG. 10 shows a flowchart of functional interaction of the components of the device.

The preferred embodiment of the proposed device works as follows: when the power supply 11 (+U) of the device is turned on, a program starts in the CPU 6 (FIG. 1A and FIG. 10). That allows for generation of electromagnetic pulses with an initial frequency of 25 kHz and a fixed pulse duty cycle 0.84. The duty cycle is understood as the ratio of pulse duration to oscillation period. One period of oscillation with such duty cycle is shown in FIG. 3B, where it is input to Gate (FIG. 3A) of MOSFET of the antenna amplifier 7 (FIG. 1A).

Figure 4:
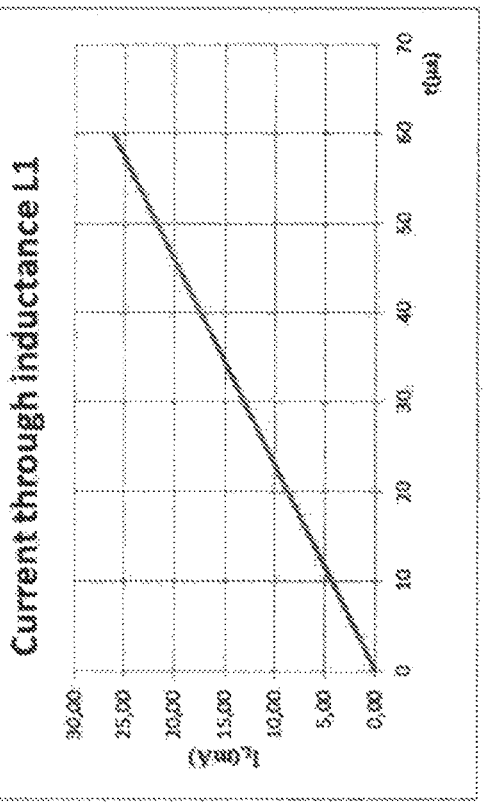
FIG. 4 shows a graph illustrating the current build-up through the solenoid L1 at the beginning of an electromagnetic cycle. The graph is based on real experimental data.

During the time between points C and D (FIG. 3B), the transistor VT1 is open and the current increases through the solenoid L1 (FIG. 4). From the graph (FIG. 4) it can be seen that during the time between points C and D (FIG. 3B), equal to 60 μs, the current reaches a value of 26 mA. At a command of the CPU 6, at point D (FIG. 3B), the control voltage at Gate of the transistor abruptly changes to zero, the transistor closes the conduction channel and interrupts the current through the solenoid L1.

Interruption of the current through the solenoid L1 generates an EMF of self-induction, which prevents an instantaneous change in current and seeks to maintain its magnitude and direction due to the energy stored in the magnetic field of the solenoid L1.

The value of the EMF of self-induction is described by the equation:

$$\mathcal{E}_L = L \times \frac{dI_L}{dt},$$

$\mathcal{E}_L$—voltage on the solenoid L1, generated by the self-induction EMF, L—is the value of the inductance of the solenoid L1, $I_L$—is the current strength through the solenoid L1 at the moment of braking the circuit, t—is the turn-off time of the transistor VT1.

Figure 5:
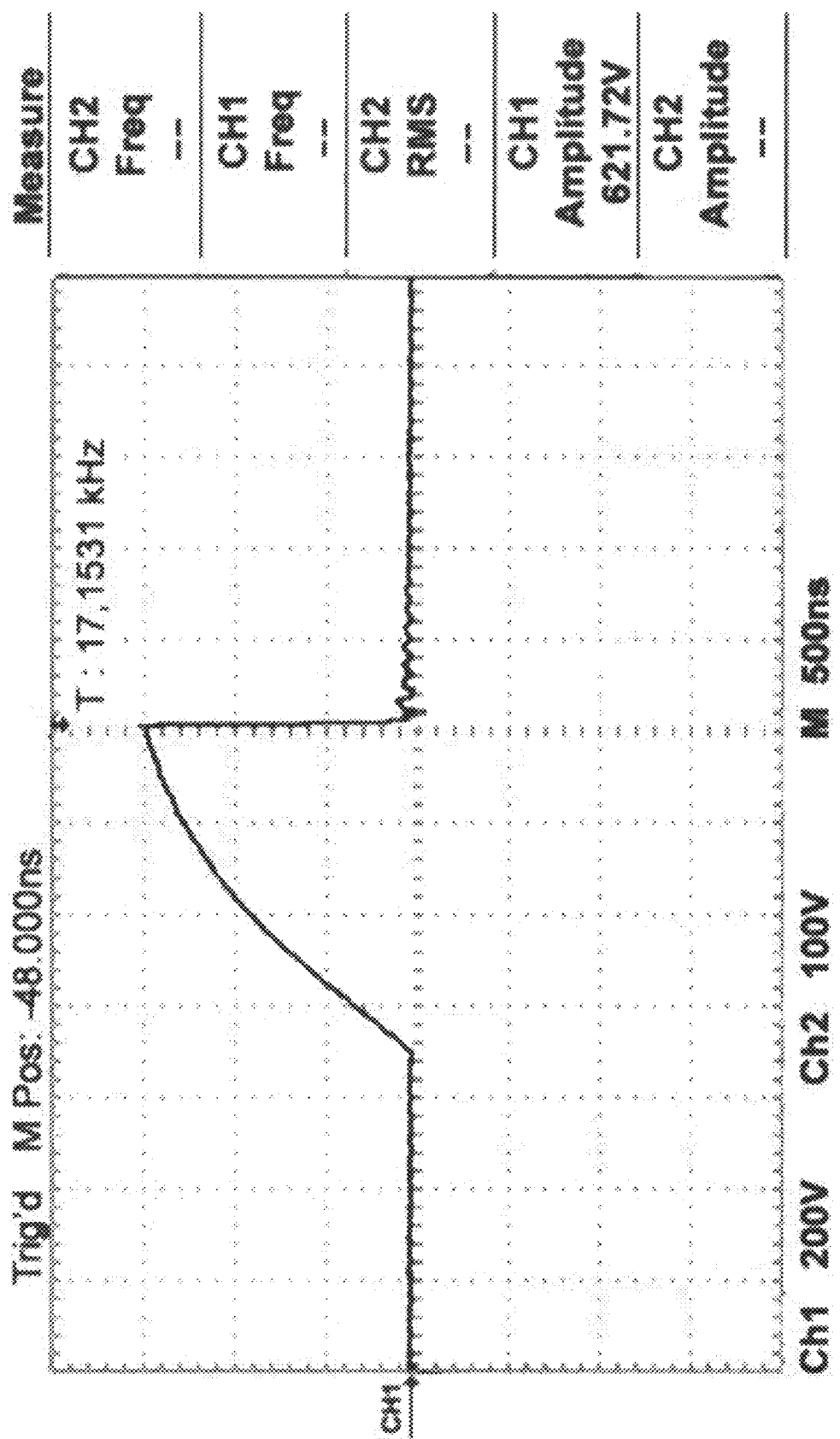
FIG. 5 shows an oscillogram (waveform) of the real process of charging the capacitor C1 (shown in FIG. 3A) by self-induction current of the solenoid L1 (shown in FIG. 3A).

Since the turn-off time of the transistor is very short and amounts to several tens of nanoseconds, the amplitude of self-induction EMF reaches a value of several kilovolts. Such a voltage would easily destroy any MOSFET transistor, but this does not happen, since the energy of the magnetic field is dumped into the capacitor C1, which was previously in a state of full discharge. The voltage on the capacitor C1 cannot change instantly, and therefore such a signal is observed on the voltage oscillogram at the point of drain of transistor VT1 (FIG. 5).

When the transistor is powered by 12V, the voltage amplitude at the drain of transistor VT1 at maximum is almost 622 volts. The energy of magnetic field was converted into the energy of electric field of the capacitor C1, charging it to a high voltage in 1.7 microseconds. The amplitude maximum corresponds to point E in FIG. 3B.

By the time, the transistor VT1 is turned on again, the capacitor C1 is charged to a high voltage, the capacitor C2 is also charge, but to a lower voltage, since its capacitance is much larger than the capacitance of capacitor C1, (which, along with the radiating antenna, determines the process and parameters of electromagnetic wave generation) and its charging was prevented by inductance La of the radiating antenna 5. A much larger charge was preserved in the virtual capacitance Ce (FIG. 3A). Due to its small size, which varies within a few hundred picofarads, it managed to accumulate a significant charge.

At the time point corresponding to point E in FIG. 3V, the transistor in VT1 turns on, which very quickly discharges the capacitor C1 and reverses the current in the radiating antenna 5. To see the configuration and magnitude of the current in the antenna, a special current meter with strong common-mode rejection was used to eliminate the influence of the stray field of the emitting antenna on the measured parameter.

Oscillogram No. 12 (FIG. 6) shows the voltage at the drain of the transistor VT1 or, which is the same, on the capacitor C1. Oscillogram #13 shows the change in current in the radiating antenna 5. Detail analysis of the current curve in the radiating antenna 5 (FIG. 3A) shows the following:

Interval A-B. At point A (FIG. 6), which corresponds in time to point D in FIG. 3V transistor VT1 is off. The self-induction EMF of the solenoid L1, caused by an interruption of the current IL1 (FIG. 3A), forms a new current $I_{SI}$ (self-induction), which, splitting at point A (FIG. 3A) into currents I1 and I2, charges the capacitors C1, C2, and Ce. The energy of the magnetic field of the solenoid L1 is transformed into the energy of the electric field of the capacitors. The energy of magnetic field is determined by the following expression:

$$E_M = \frac{L \times I_L^2}{2},$$

wherein:
L is the value of the inductance of the solenoid L1.
The energy of electric field for a capacitor is determined by the expression:

$$E_e = \frac{C \times U^2}{2},$$

wherein:
C is capacitance of the corresponding capacitor, U is the voltage on its plates.

Interval B-C. At time B (FIG. 6), which corresponds to point E (FIG. 3B), the transistor is turned on and very fast, in 10-12 ns, the capacitance C1 is discharged. This is the beginning of formation of an electromagnetic wave. The energy stored in reactive elements of the radiating antenna causes a significant current surge of the radiating antenna 5 in the direction opposite to the charging current I2 (FIG. 3B) through the open transistor VT1. The amplitude of the electromagnetic wave reaches its maximum.

Interval C-D. The area of attenuation of an electromagnetic wave. Generation stops until the start of the next cycle.

The sensitivity of the current meter 21 to the radiating antenna 5 (at point B of FIG. 3A) was 2.5 mA/mV. That is, every 2.5 milliamps of antenna current generated one millivolt of the meter signal.

Figure 6:
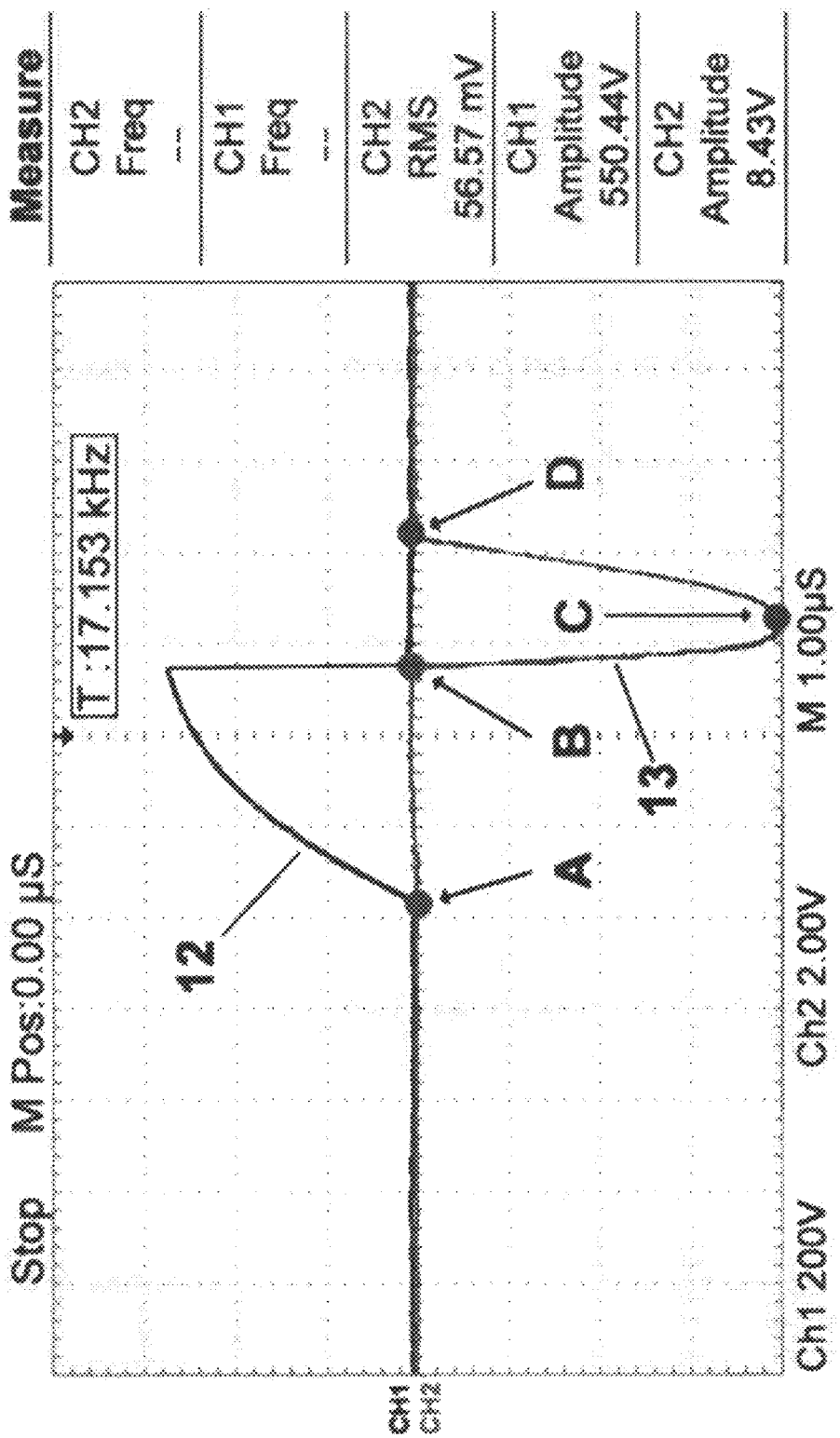
FIG. 6 shows an oscillogram of the current of the radiating antenna with time reference to the charge curve of the capacitance C1 (shown in FIG. 3A).

FIG. 6 in the Measure section, the amplitude of the current in the antenna (CH2 Amplitude) was 8.43V. If you convert to milliamps, you get:

$$I_2 = 2,5\left(\frac{\text{MA}}{\text{mV}}\right) \times 8430(\text{MV}) \approx 21000\,\text{MA} = 21\,\text{A}.$$

It is important to understand that, despite such an impressive value of the current strength, its duration is very small. The entire process of generating the electromagnetic wave takes just over one microsecond.

In order to allow such a large flow of electricity from the radiating antenna 5, the capacitor bank C2 (FIG. 3A) is preferably formed by four capacitors connected in parallel. The magnitude of the current flowing through each of them is slightly more than 5 A. To eliminate losses on the conductors of the printed circuit board, these four capacitors are soldered directly to the terminals of the hermetic connector 8 of the radiating antenna 5 (FIG. 1C).

Figure 7:
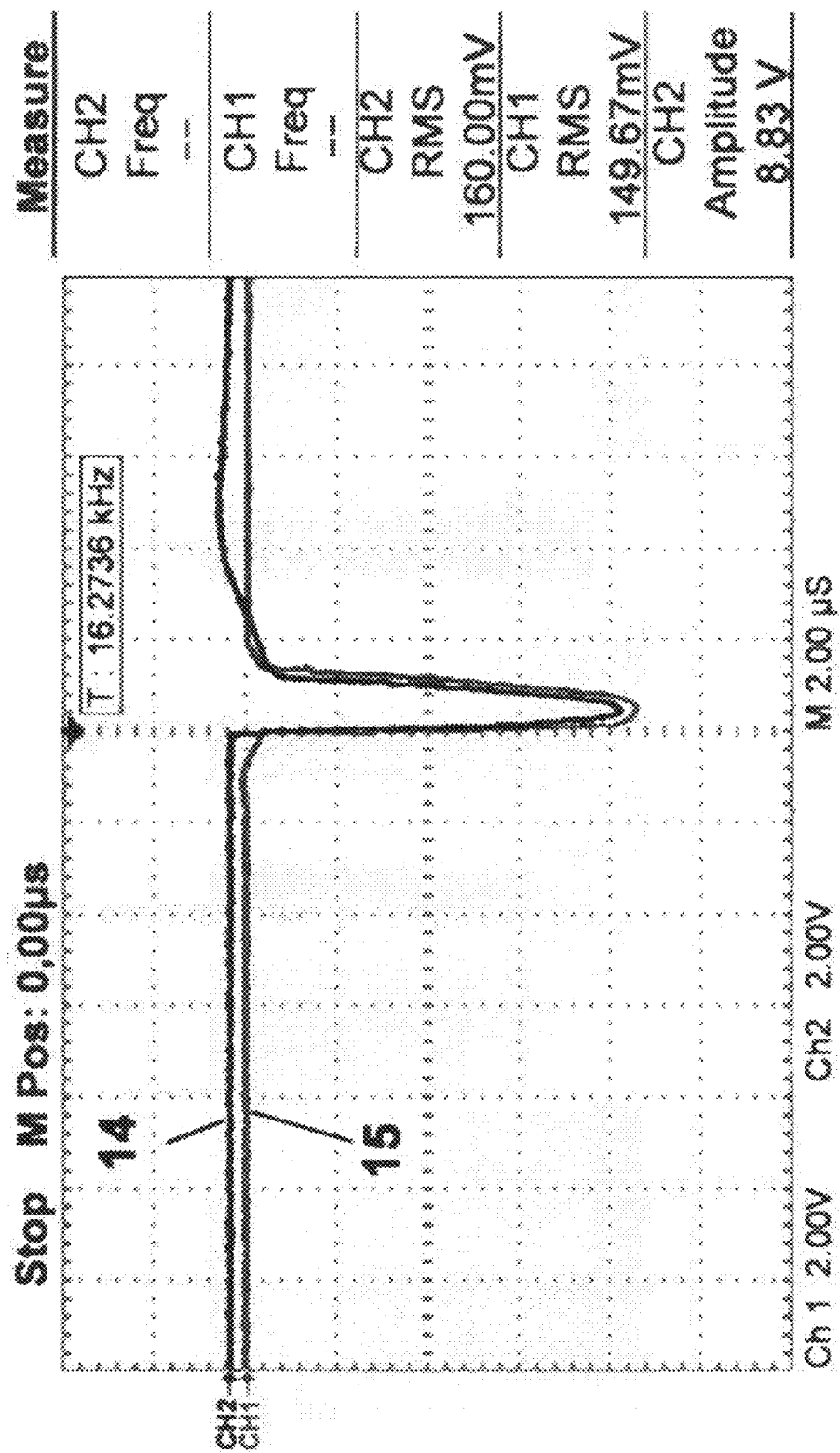
FIG. 7 shows an oscillogram of the magnetic field induction spreading along the pipeline, with time reference to the current pulse in the radiating antenna at a certain measurement point

To experimentally confirm the above processes, a magnetic induction meter using a Hall sensor was used. The electromagnetic protection device was installed on a steel pipe with a diameter of 2.5 inches and a length of 2.5 meters. The radiating antenna was placed on the edge of a steel pipe simulating pipeline 2 (FIG. 1A). The magnetic field induction was measured at a distance of one meter from the center of the emitting coil. Measurement waveforms are shown in FIG. 7.

Oscillogram 14 (FIG. 7)—current in the antenna 5, oscillogram 15—magnetic field induction. It can be seen that the differences between the two oscillograms are quantitative, and the waveforms correspond to each other. And this is correct since the magnetic field induction is generated by the antenna current.

Figure 9:
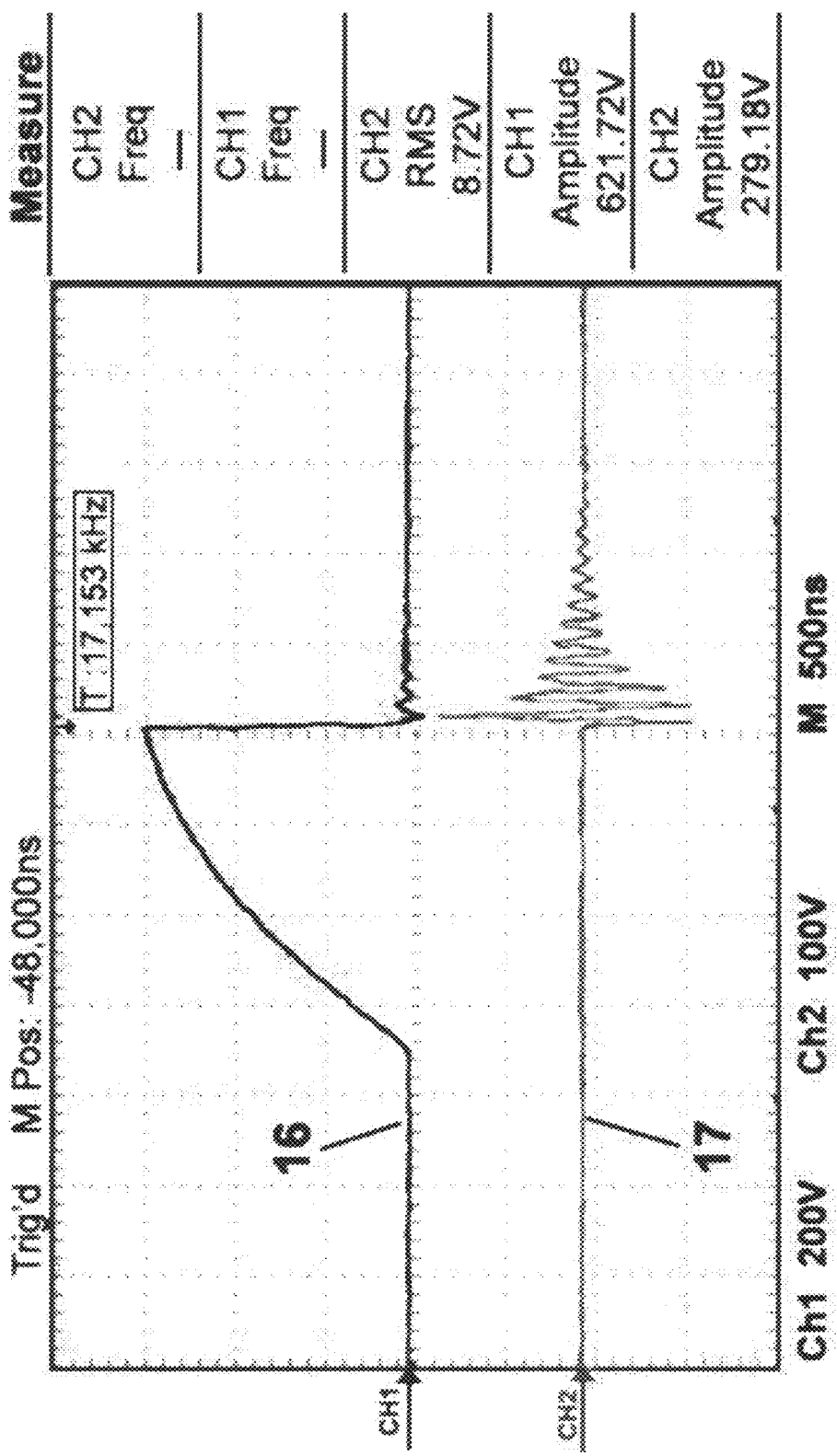
FIG. 9 shows an oscillogram of the electromagnetic wave process, obtained using the scheme shown in FIG. 8, with time reference to the charge pulse of the capacitor C1 (shown in FIG. 3).

Thus, an independent measuring device confirmed the above explanation. For registration of the electromagnetic wave, the measuring coil 16 was used, which was disposed at a certain distance from the radiating antenna 5 (FIG. 8). The electromagnetic wave generated by the radiating antenna 5, propagating along the steel pipeline 2, as along a waveguide, induces an EMF on the turns of measuring coil 16, which is recorded by the oscilloscope 18. The result of the experiment is presented in the oscillograms of FIG. 9.

Oscillogram 16 shows the signal on the capacitor C1 (FIG. 3A), the voltage across it is almost 622 volts. At the moment the transistor VT1 is turned on, the voltage on C1 very quickly drops to zero, the current in the antenna 5 reaches its maximum value (section BCD in FIG. 6) and generation of an electromagnetic wave begins (oscillogram 17), the amplitude of which on the measuring antenna 16 (FIG. 8), located at a distance of 200 cm from the radiating antenna 5, reached a value of 279 volts.

Control Process of the Inventive Device.

According to the preferred embodiments of the invention, the operation of the electromagnetic protection device is controlled as follows.

When electric power is supplied to the device, the microprocessor program of the CPU 6 starts running (FIG. 10). The main task of the program is to find the optimal frequency for generating an electromagnetic wave, which, albeit within small limits, will depend on the physical parameters of the pipeline, such as dimensions, grade of steel, or other metal which it is made of. The primary criterion for choosing a frequency will be the maximum current of the radiating antenna, the secondary criterion is the amplitude of self-induction EMF at the input of the radiating antenna, which should not exceed 580V. Information for deciding is supplied to the program by two sensors: Antenna Voltage Sensor (AVT) 22 (FIG. 3A, FIG. 10)—which controls voltage at the input of the radiating antenna, Antenna Current Sensor (ACS) 21 (FIG. 3A, FIG. 10), which measures current in the radiating antenna 5. The antenna amplifier 7 controls the energy of power supply unit 11, directing it to reactive elements of the radiating antenna 5 under control of the microprocessor of CPU 6 (FIG. 1A, FIG. 10). The status of the device is shown by the sign panel 10 (FIG. 1A), which shows the current level of the radiating antenna 5 and, in case of exceeding the permissible voltage at the input of the radiating antenna 5, can, for example, change the color of the device readiness LED from green to red.

The electromagnetic wave, spreading through the pipeline 2, destroys adhesive forces that contribute to sticking of unwanted deposits on the inner walls of pipeline 2.

As mentioned above, these forces are electromagnetic and are not able to withstand the effects of a more powerful electromagnetic field, which is generated by the radiating antenna 5 of the electromagnetic protection device.

As a result, all third-party components dissolved in the liquid are carried out by its flow from the device's coverage area. Depending on the modification of the electromagnetic protection device, its coverage area can extend from 500 meters to several kilometers, and the design assumes the use of mainly two power supply options: from a battery or from an industrial AC voltage grid 80-264V, 50/60 Hz, although options for powering the device from renewable energy sources are also possible, as mentioned above.

Installation of the Device.

The order of installation of the device on the pipeline 2 follows. A cable forming the radiating antenna 5 has a mating part (for the connector 8) that is passed through the channel 27 of the first rotatable spacer 4 and connected to a receiving part of the connector 8 installed on the top cover 23 of the case 1. Next, the plastic tape 3 is fixed on the pipeline 2 and the device case 1 is installed in two loops formed by the tape 3. Then turns of the antenna's cable are wound onto the pipeline 2, forming a radiating antenna 5. The turns are temporarily fixed, for example, using scotch-tape. Then the second rotatable spacer 4 is installed on the cover 23 so that the upper part thereof gets on the last turns of the radiating antenna 5. Further, by rotating the bushing 24 (FIG. 11), the two rods 25 and 26 with different thread orientations are gradually unscrewed from the internal thread of the bushings 24 of both rotatable spacers 4, while increasing the height of the rotatable spacers 4, and thus increasing the distance between the surface of the pipeline 2 and the cover 23, stretching the tapes 3 and fastening the case 1 to the pipeline 2. The operation continues until the case 1 of the device is securely fixed to the pipeline 2. Thereafter, the temporary scotch-tape is removed and the device is ready for operation. The power supply of the device is switched on by a special switch with an increased level of protection against moisture and dust, on the sidewall of case 1.

The invention claimed is:

1. An electromagnetic device for protection of a metal pipeline (2) used for transmission of liquid hydrocarbons therethrough to prevent adhesion of impurities dissolved in said liquid hydrocarbons to an inner surface of the pipeline (2); said device comprising:
    a case (1) secured on the pipeline (2) by at least two loop-shaped flexible tapes (3), said case (1) has a top cover (23);
    a power supply unit (11) mounted in the case (1) and providing said device with electrical energy;
    a radiating antenna (5) transmitting an electromagnetic wave further propagating along the pipeline (2), wherein the radiating antenna (5) is made in the form of an electrically insulated wire (28) wound on the pipeline (2), and wherein the wire (28) represents a first plate of a virtual capacitor (Ce), while a second plate of said virtual capacitor (Ce) is represented by an outer surface (30) of the pipeline (2);
    a central processing unit CPU (6) controlling operation of said electromagnetic device, wherein the CPU (6) is enclosed in the case (1);
    an antenna amplifier (7) exciting said electromagnetic wave in the radiating antenna (5), wherein the antenna amplifier (7) is enclosed in the case (1), and wherein the antenna amplifier (7) further includes:
        a solenoid (L1) for accumulating energy of magnetic field;

a high voltage MOSFET transistor (VT1) essentially controlling discharging the energy of magnetic field into the radiating antenna (5), said transistor (VT1) is connected to the solenoid (L1);

a buffer high-voltage capacitor (C1) protecting the transistor (VT1) from surges of overvoltage, said capacitor (C1) is parallel-connected to said transistor (VT1) and series-connected to the solenoid (L1);

a passing capacitor (C2) series-connected to the solenoid (L1), and said passing capacitor (C2) is series-connected to the radiating antenna (5) and the virtual capacitor (Ce), wherein said passing capacitor (C2), radiating antenna (5) and the virtual capacitor (Ce) are parallel-connected to said transistor (VT1);

an antenna current sensor (21), providing information about a current signal of the radiating antenna (5) to the CPU (6); and a voltage sensor (22) providing information about a voltage level on the solenoid (L1) to the CPU (6);

an electrical connector (8) secured in the top cover (23), and connecting the radiating antenna (5) to the antenna amplifier (7);

an electromagnetic screen (9) mounted within the case (1) and enclosing the CPU (6) and to the antenna amplifier (7); and a display panel (10) for visual monitoring of status and operation of said device, wherein the display panel (10) is mounted on a side surface of the case (1).

2. The electromagnetic device according to claim 1, wherein said at least two loop-shaped flexible tapes (3) are represented by two loop-shaped flexible tapes (3); said device further comprising:

two rotatable spacers (4) placed between a surface of the pipeline (2) and the top cover (23); said rotatable spacers (4) provide for changing a distance between the surface (30) of said pipeline (2) and the top cover (23) for fixedly securing said device to the pipeline (2) in cooperation with said two loop-shaped flexible tapes (3); each of the rotatable spacers (4) includes:

(a) a bushing (24) formed of:

an upper hollow cylinder having an upper inner diameter, wherein a left-hand spiral threading is applied to an inner surface of the upper hollow cylinder;

a lower hollow cylinder having a lower inner diameter, wherein a right-hand spiral threading is applied to an inner surface of the lower hollow cylinder;

a middle hollow cylinder having a middle inner diameter, said middle hollow cylinder connects the upper hollow cylinder with the lower hollow cylinder, wherein the middle inner diameter is less than the upper inner diameter and the lower inner diameter;

b) an upper rod (25) having a through axial hole, wherein a left-handed screw thread is applied to an outer surface of the upper hollow rod (25) mating with the left-hand screw thread of the upper hollow cylinder, so that the upper rod (25) is capable of moving vertically relative to the upper hollow cylinder, and a top of the upper hollow cylinder is shaped as a cylindrical segment mating with a surface of the radiating antenna (5); and c) a lower rod (26) having a through axial hole, wherein a right-hand screw thread is applied to an outer surface of the lower rod (26) mating with the right-hand screw thread of the lower hollow cylinder, so that the lower rod (26) is capable of moving vertically relative to the lower hollow cylinder, and a bottom of the lower hollow cylinder formed as an annular base fixed on the cover (23).

3. The electromagnetic device according to claim 2, wherein:

an internal through channel (27) is collectively formed by:
the through axial hole of the upper hollow rod (25),
the through axial hole of the lower hollow rod (26), and
an inner space formed by parts of cavities of the upper hollow cylinder, the middle hollow cylinder and the lower hollow cylinder enclosed between the upper rod (25) and the lower rod (26);

said two rotatable spacers (4) further consist of a first rotatable spacer (4) and a second rotatable spacer (4);

said hermetic electrical connector (8) is built into a bottom of the first rotatable spacer (4); and said radiating antenna (5) further includes a first end (5a) passing through the channel (27) of the first spacer (4) and a second end (5b) fixed to the cover (23).

4. The electromagnetic device according to claim 1, wherein: said power supply unit (11) is represented either by an industrial grid of alternating voltage, or an accumulating battery.

\* \* \* \* \*

UNITED STATES PATENT AND TRADEMARK OFFICE
CERTIFICATE OF CORRECTION

PATENT NO. : 11,908,619 B2
APPLICATION NO. : 17/687301
DATED : February 20, 2024
INVENTOR(S) : Leonid Mikhaylovich Kovalev et al.

It is certified that error appears in the above-identified patent and that said Letters Patent is hereby corrected as shown below:

On the Title Page

Item (71) Applicant:
SediFlo LLC, Houston, TX (US)

Should be corrected to:
Leonid Mikhaylovich KOVALEV, Astrakhan (RU);
Evgeniy Leonidovich KOVALEV, Astrakhan (RU);
Evgeny SOKRYUKIN, Odintsovo (RU);
Kirill SOKRYUKIN, Odintsovo (RU);
Egor SOKRYUKIN, Odintsovo (RU)

Signed and Sealed this
Eleventh Day of June, 2024

Katherine Kelly Vidal
*Director of the United States Patent and Trademark Office*